United States Patent Office 3,325,525
Patented June 13, 1967

3,325,525
PROCESS FOR PREPARING PHENYL-SILOXANEDIOLS
Paul I. Prescott, Burnt Hills, and Terry G. Selin, Schenectady, N.Y., assignors to General Electric Company, a corporation of New York
No Drawing. Original application Nov. 1, 1962, Ser. No. 234,884, now Patent No. 3,222,369, dated Dec. 7, 1965. Divided and this application Aug. 17, 1964, Ser. No. 390,209
3 Claims. (Cl. 260—448.2)

This application is a division of our earlier filed application, Ser. No. 234,884, filed Nov. 1, 1962, now U.S. Patent 3,222,369 issued Dec. 7, 1965, and assigned to the same assignee as the present invention.

This invention is concerned with a process for preparing high purity phenylsiloxanediols from amine complexes (hereinafter so designated) of the formula I 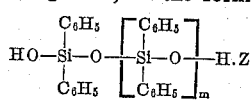

where $m$ is a whole number equal to from 1 to 2, inclusive, and Z is an organic amine moiety consisting of carbon, hydrogen, and nitrogen atoms, the said amine being selected from the class consisting of primary, secondary and tertiary amines. Specifically, the invention also relates to a process for preparing a high purity disiloxanediol selected from the class consisting of 1,1,3,3-tetraphenyldisiloxanediol-1,3 and 1,1,3,3,5,5-hexaphenyltrisiloxanediol-1,5 (hereinafter referred to as the "phenylsiloxanediol") by contacting an amine consisting of carbon, hydrogen and nitrogen atoms selected from the class consisting of primary, secondary and tertiary amines with a hydrolysis product of a diphenyl dihydrolyzable silane thereby to form the amine complex of the phenylsiloxanediol, and thereafter treating the formed complex to obtain the essentially pure phenylsiloxanediol, i.e., the tetraphenyldisiloxanediol or the hexaphenyltrisiloxanediol of Formula I without the amine moiety.

Hydroxylated silanes and hydroxylated polysiloxanes have been employed to improve the properties of siloxane elastomers. Thus, as shown in U.S. Patent 2,890,188 issued June 9, 1959, the presence of these hydroxylated organosilicon compositions in organopolysiloxane elastomers prevents premature hardening of these organopolysiloxane polymers containing reinforcing fillers thus obviating the necessity of treating the filler. Additionally, the presence of these hydroxylated organosilicon compositions improves other properties of the vulcanized elastomer, particularly the thermal stability of such compositions.

Hydroxylated organosilicon compounds which have been found eminently suitable for the above purpose are 1,1,3,3-tetraphenyldisiloxanediol-1,3 and 1,1,3,3,5,5-hexaphenyltrisiloxanediol-1,5. The latter compositions are ordinarily obtained by hydrolyzing a diphenyl dihydrolyzable silane, such as diphenyldichlorosilane, with water in an excess of a suitable solvent at relatively low temperatures (e.g., −10 to 20° C.). Included in the hydrolysis reaction product are the above phenylsiloxanediols and higher polymers. However, in order to isolate the former compositions, a great deal of processing effort (including repeated recrystallizations) has been required in the past and this has involved a considerable expenditure of time and money. Even after such processing, the yields of the desired phenylsiloxanediol are relatively low since during hydrolysis and processing the phenylsiloxanediol tends to condense to form higher molecular weight products, thus contributing to the reduced yield of the above desired phenylsiloxanediols.

Unexpectedly, we have discovered that certain amines have an unpredicted affinity for these phenylsiloxanediols and by taking advantage of this affinity, we are able to isolate the desired phenylsiloxanediol in the form of an amine complex of the phenylsiloxanediol from mixtures containing the latter in a relatively short period of time with a minimum of processing steps. These amine complexes can be readily decomposed to give essentially pure 1,1,3,3-tetraphenyldisiloxanediol-1,3 or 1,1,3,3,5,5-hexaphenyltrisiloxanediol-1,5. This rapid and relatively inexpensive method for isolating the phenylsiloxanediol is accomplished by contacting the hydrolysis product of the diphenyldihydrolyzable silane (either the bulk hydrolysis product or crudely isolated phenylsiloxanediols) with the amine, isolating the amine complex which, most usually being crystalline, is readily removed by filtration, and, thereafter decomposing the amine complex by suitable means whereby essentially pure phenylsiloxanediol is obtained.

One of the unexpected discoveries was that, of the cyclic tertiary amines containing nitrogen in the ring, pyridine had a unique characteristic of having a special affinity for the phenylsiloxanediol so that when the pyridine complex of the phenylsiloxanediol was made, it was found that this pyridine complex was insoluble in diethyl ether making it quite easy to separate the pyridine complex from the remainder of the reaction mixture. This diethyl ether insolubility of the pyridine complex was not a characteristic of complexes of the phenylsiloxanediol made with other amines, such as pyrrole, triethylamine, quinoline, isoquinoline, picoline, lutidine, collidine, aniline, or cyclohexylamine.

The diphenyl dihydrolyzable silanes employed to make the phenylsiloxanediol are those having the formula II 

where X is a hydrolyzable group selected fro the class consisting of halogen (e.g., chlorine, bromine, fluorine, etc.), acyloxy (e.g., acetoxy, propionoxy, etc.), organoxy (e.g., methoxy, ethoxy, propoxy, phenoxy, etc) radicals.

Hydrolysis of the diphenyl dihydrolyzable silane with water is advantageously carried out under such conditions and in the presence of a suitable inert solvent which tend to give the low molecular weight products and specifically the aforesaid phenylsiloxanediols. This is usually accomplished by employing temperatures of from about −10° C. to 20° C., employing for the purpose, solvents such as acetone, diethyl ether, benzene, toluene, xylene, cyclohexane, etc. Generally, it is only necessary to add the diphenyl dihydrolyzable silane to an amount of water at least sufficient to hydrolyze essentially all the silicon-bonded hydrolyzable groups employing the solvent, on a weight basis, in an amount ranging advantageously from about 0.1 to about 10 parts or more per part of the diphenyl dihydrolyzable silane.

The amines which may be employed in the practice of the present invention may be either primary, secondary or tertiary amines and may be aliphatic or aromatic amines. Included in these amines are cyclic aliphatic amines in which nitrogen is part of the ring. Among the primary, secondary and tertiary amines which may be employed are those having the general formula III 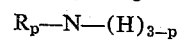

where $p$ is a whole number equal to from 1 to 3 and R is a monovalent hydrocarbon radical selected from the class consisting of alkyl radicals (e.g., methyl, ethyl, propyl, isobutyl, butyl, dodecyl, etc.); aryl radicals (e.g., phenyl, biphenyl, naphthyl, etc.); aralkyl radicals (e.g., benzyl, phenylethyl, etc.); alkaryl radicals (e.g., tolyl, xylyl, ethylphenyl, etc.); alkenyl radicals (e.g., vinyl, allyl, methallyl, etc.)

Among the primary, secondary and tertiary amines which can be employed corresponding to the above Formula III are, for instance, trimethyl amine, triethyl amine, tripropyl amine, dimethyl amine, diethyl amine, diphenyl amine, tribenzyl amine, cyclohexyl amine, etc.

Another class of organic amines which may be employed are those having the formula IV 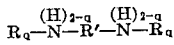

where $q$ is a whole number equal to from 0 to 2, inclusive, R has the meaning given above and R' is a divalent hydrocarbon radical of either the aliphatic or aromatic series. Among such divalent radicals may be mentioned the methylene radical, ethylene radical, propylidine [—CH(CH$_3$)CH$_2$—] radical, phenylene radical (—C$_6$H$_4$—), etc. Among such compounds may be mentioned methylene diamine, N,N'-dimethyl ethylene diamine, ethylene diamine, phenylene diamine (where the amino groups may be ortho, meta or para), N,N'-dimethyl ethylene diamine, N,N,N', N'-tetramethyl ethylene diamine, etc.

Among the cyclic amines in which nitrogen is part of the ring structure may be mentioned, for example, pyridine, pyrrole, quinoline, isoquinoline, picoline, lutidine, collidine, piperazine, etc.

The amine is added in any desired amount, but advantageously in an amount equal to from about 0.25 to about 10 or more moles, and preferably from 0.75 to 2 moles of the amine per mole of the diphenyl dihydrolyzable silane used. For optimum results it is only necessary to add a sufficient amount of the amine so that there would be present in the hydrolysis mixture about one mole of amine per mole of the formed phenylsiloxanediol or mixture of phenylsiloxanediols. However, the use of smaller or larger molar concentrations of the amine is not precluded. Heating at this point of the reaction mixture up to temperatures of from 40° to 80° C. is not precluded. It is often desirable to remove from the amine complex, the diphenylsilanediol which often separates out in the presence of certain of the solvents used in making these complexes. There is thus obtained in the reaction mixture a crystalline complex which has the Formula I where $m$ and Z have the representations given above. The addition of the amine can be made to the hydrolysis product directly, using the same solvents employed for hydrolysis purposes. Alternatively, the crude phenylsiloxanediol can be separated and dissolved in the same class of inert solvents (i.e., inert to the reactants or reaction products) used in the above hydrolysis of the diphenyl dihydrolyzable silane and the amine can then be added to this solution. When the crude phenylsiloxanediol is isolated and dissolved in a solvent prior to addition of the amine, the phenylsiloxanediol is used on a weight basis, of from 0.2 to 10 or more parts of the solvent per part of phenylsiloxanediol.

The above amine complex can be readily treated to obtain the essentially pure phenylsiloxanediol. Thus, the isolated amine complex can be heated at a temperature of about 75–100° C. at a reduced pressure of about 1–50 mm. whereby the amine is removed to leave behind essentially pure phenylsiloxanediol. Alternatively, the complex can be mixed with weak acids such as formic acid, acetic acid, etc., or with dilute strong acids, e.g., dilute aqueous solutions of hydrochloric, sulfuric, phosphoric, etc., acids, to sever the bond between the amine and the phenylsiloxanediol, again to yield essentially pure phenylsiloxanediol.

As pointed out above, the phenylsiloxanediol itself can be used for reducing the structure of organopolysiloxane elastomers containing reinforcing fillers. Thus it is apparent that the amine complex constitutes an important intermediate for obtaining pure phenylsiloxanediol. The above-mentioned complex can also be employed as a reactant for making cyclic organopolysiloxanes as is more particularly disclosed in our copending application Ser. No. 234,883, filed Nov. 1, 1962, and assigned to the same assignee as the present invention. Thus, the amine complex of 1,1,3,3-tetraphenyldisiloxanediol-1,3 can be reacted with a diorganodihydrolyzable silane, such as, for instance, dimethyldichlorosilane or diphenyldichlorosilane, to give cyclic polymers having, respectively, the formulas

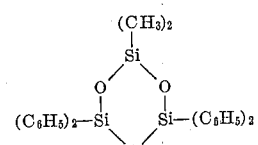

and $$[OSi(C_6H_5)_2]_3$$

The above cyclic compositions are more specifically disclosed and claimed in U.S. patent applications, Ser. No. 160,264, now abandoned, in the name of Christian R. Sporck, and Ser. No. 160,267, now abandoned, in the name of Howard A. Vaughn, both filed Dec. 18, 1961 and assigned to the same assignee as the present invention.

These cyclic polymers can be heated in the presence of organopolysiloxane rearrangement and condensation catalysts to make silicone elastomers useful in electrical insulation and heat-protective applications, as is more particularly disclosed and claimed in Brown et al. application, Ser. No. 160,266, filed Dec. 18, 1961, now abandoned, and assigned to the same assignee as the present invention.

In order that those skilled in the art may better understand how the present invention may be practiced, the following examples are given by way of illustration and not by way of limitation. All parts are by weight unless otherwise indicated.

*Example 1*

23 grams of the 1,1,3,3-tetraphenyldisiloxane-diol-1,3 prepared in Example 1, 250 ml. of purified n-hexane, and 40 grams of dry pyridine were mixed together and stirred for several hours. There was thus obtained a large amount of crystalline material which was filtered, washed with n-hexane again and air-dried to yield 27.1 grams of the desired pyridine complex of the tetraphenyldisiloxanediol. This composition which was obtained in a 99% yield was identified as the pyridine complex of the aforesaid tetraphenyldisiloxanediol having the formula VI 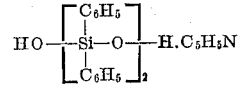

as evidenced by the following analyses:

| Element | Found | Theoretical |
| --- | --- | --- |
| Percent H | 5.29 | 5.45 |
| Percent C | 70.48 | 70.41 |
| Percent N | 2.79 | 2.84 |
| Percent Si | 11.57 | 11.36 |
| Percent hydroxyl (—OH) | 6.79 | 6.89 |

*Example 2*

In this example, 20.7 grams 1,1,3,3-tetraphenyldisiloxanediol-1,3 prepared in Example 1 was mixed with 7.9 grams pyridine in equimolar concentrations, employing a solution of the phenylsiloxanediol in 100 ml. diethyl ether. Immediately after addition of the pyridine, a crystalline composition deposited and this was filtered and identified as the pyridine complex of the phenylsiloxanediol having Formula VI. This composition had a melting point of 123–124.5° C. and was stable in a vacuum of 2 mm. Hg when measured at 65° C.

Example 3

This example illustrates the isolation of pure tetraphenyldisiloxanediol-1,3 from the complex thereof. More particularly, about 5 parts of the phenylsiloxanediol pyridine complex prepared in Example 3 was mixed with about 10 parts of diethyl ether and 10 parts water. Thereafter, about 0.01 part concentrated HCl (about 37% HCl) was added. Whereas initially the complex was insoluble in the diethyl ether and water mixture, after the HCl was added the solid quickly went into solution. The ether layer was separated and the ether was evaporated on a steam bath to yield a solid composition. Upon recrystallization of this solid from hot benzene and hexane, pure tetraphenyldisiloxanediol-1,3 was obtained having a melting point of 112–114° C. A mixed melting point with a pure sample of tetraphenyldisiloxanediol-1,3 (which is described in the Journal of the American Chemical Society, 67, 2173–2174 (1945)), gave no depression in the melting point.

Example 4

About 253 grams diphenyldichlorosilane in 200 ml. acetone was added to 400 ml. water mixed with 400 ml. acetone. The mixture was stirred for about 5 minutes and thereafter 750 ml. additional water was added to insure complete hydrolysis of the silicon-bonded chlorines and to facilitate the formation of a two-phase system. After allowing the hydrolysis mixture to stand for about 18 hours, the acetone layer was removed, washed with an additional amount of 500 ml. water and the acetone was evaporated to dryness to give a slightly oily solid which was composed mainly of diphenylsilanediol, 1,1,3,3-tetraphenyldisiloxanediol-1,3 and higher polysiloxanediols predominantly 1,1,3,3,5,5 - hexaphenyltrisiloxanediol-1,5. The oily solid mass was dissolved in 150 ml. diethyl ether and 150 ml. pyridine was added. A precipitate of the phenylsiloxanediol pyridine complex was obtained immediately. This precipitate was removed by filtration, washed with about 100 ml. diethyl ether to yield about 140 grams essentially pure pyridine complex of 1,1,3,3-tetraphenyldisiloxanediol-1,3. The remaining ether solution was evaporated to dryness over a steam bath under vacuum at a temperature somewhat below 75° C. to remove essentially all the diethyl ether. The remaining liquid containing pyridine was further evaporated on a steam bath to yield a solid-oil mixture. To this mixture was added 75 ml. diethyl ether to render insoluble a further amount of the above phenylsiloxanediol complex which was removed by filtration, washed with diethyl ether, the diethyl ether removed to yield an additional 45 grams of the phenylsiloxanediol complex.

Example 5

About 10 parts diphenylsilanediol (which is a first order hydrolysis product of diphenyldichlorosilane) in 10 parts benzene was mixed with an amount of pyridine in molar excess of the diphenylsilanediol and the mixture was heated at a temperature of about 80° C. for about 5 minutes, to yield the above-described phenylsilanediol-pyridine complex as a precipitate when the reaction mass was cooled to room temperature (about 23° C.).

Example 6

A number of amines were reacted with the tetraphenyldisiloxanediol-1,3 similarly as was done in the preceding examples employing for the purpose about 1 part of the phenylsiloxanediol dissolved in about 3.5 parts toluene to which was added about 1 to 2 parts of the amine and then diluting the entire mixture with 17 parts n-hexane. The solid complexes which formed were recrystallized from 1:1 weight hexane-toluene solution and thereafter identified as the desired amines of Formula I where Z represented the particular amine used. Further evidence of the amine complex was determined at the time the melting point was determined for each of the complexes since decomposition accompanying the melting point determination resulted in an odor of an amine which was the same one as used to make the complex. The following Table I shows the various amines used to make the complex together with the determined melting point (the spread being often due to liberation of the amine) together with the amine identified by odor during the melting point determination. Table II shows elemental analysis on some of the amine complexes further identifying the complexes, together with the amine content.

TABLE I

| Amine [1] | Melting Point of Complex, °C. | Amine Odor Observed During Melting |
|---|---|---|
| $(C_2H_5)_3N$ | 90–95 | $(C_2H_5)_3N$ |
| $(C_2H_5)_2NH$ | 104–109 | $(C_2H_5)_2NH$ |
| $(CH_3)_2NCH_2CH_2N(CH_3)_2$ | 98–112 | $(CH_3)_2NCH_2CH_2N(CH_3)_2$ |
| $C_6H_5NH_2$ | 86–88 | $C_6H_5NH_2$ |

[1] Amine used to make the amine complex of tetraphenyldisiloxanediol-1,3 of Formula I.

TABLE II

| Amine Complex | Found Percents | | | | Theoretical Percents | | | |
|---|---|---|---|---|---|---|---|---|
| | C | H | Si | OH | C | H | Si | OH |
| 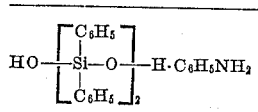 | 70.1 | 5.7 | 11.2 | 6.9 | 71.0 | 5.7 | 11.1 | 6.7 |

Amine Content: Found, 18.0%; theoretical, 18.3%.

| | C | H | Si | OH | C | H | Si | OH |
|---|---|---|---|---|---|---|---|---|
| 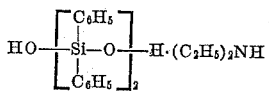 | 67.3 | 6.8 | 12.55 | 7.1 | 69.0 | 6.8 | 11.5 | 7.0 |

Amine Content: Found, 14.8%; Theoretical, 15.0%.

It will, of course, be apparent to those skilled in the art that in addition to using the hydrolysis product of diphenyldichlorosilane, hydrolysis products of other diphenyldihydrolyzable silanes, many examples of which are given above, may be employed without departing from the scope of the invention. The solvents in which the hydrolysis of the diphenyl dihydrolyzable silane is carried out or in which the phenylsiloxanediol is dissolved prior to the addition of the amine, the conditions under which the reaction with the amine to form the complex is undertaken, and the separation and isolation of the amine complex of the phenylsiloxanediol, can also be varied within wide limits as mentioned above without departing from the scope of the claimed invention.

What we claim as new and desire to secure by Letters Patent of the United States is:

1. The process for obtaining 1,1,3,3-tetraphenyldisiloxanediol-1,3 which comprises contacting pyridine with a diethyl ether solution of a hydrolysis product of a dihydrolyzable silane having the formula

wherein there is present in the hydrolysis product the aforesaid disiloxanediol, and where X is a hydrolyzable group selected from the class consisting of halogen, acyloxy, methoxy, ethoxy, propoxy, and phenoxy radicals, threreby to form a pyridine complex of the said tetraphenyldisiloxanediol, separating said complex, and thereafter treating the complex to decompose the latter and to obtain 1,1,3,3-tetraphenyldisiloxanediol-1,3.

2. The process as in claim 1 in which X is chlorine.

3. The process which comprises hydrolyzing diphenyldichlorosilane with water in an inert solvent, adding to a diethyl ether solution of the hydrolysis mixture a molar ratio of at least 2 mols of pyridine per mol of diphenyldichlorosilane used, separating the phenylsiloxanediol-pyridine complex, decomposing said complex and thereafter isolating essentially pure 1,1,3,3-tetraphenyldisiloxanediol-1,3.

No references cited.

TOBIAS E. LEVOW, *Primary Examiner.*

HELEN M. McCARTHY, *Examiner.*

P. F. SHAVER, *Assistant Examiner.*